Jan. 2, 1940.　　　　　F. C. FRANK　　　　2,185,250
BRAKE
Filed Feb. 23, 1937　　　2 Sheets-Sheet 1
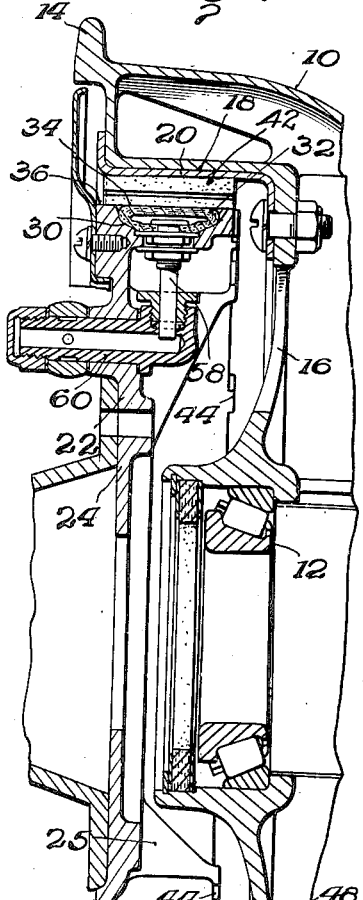
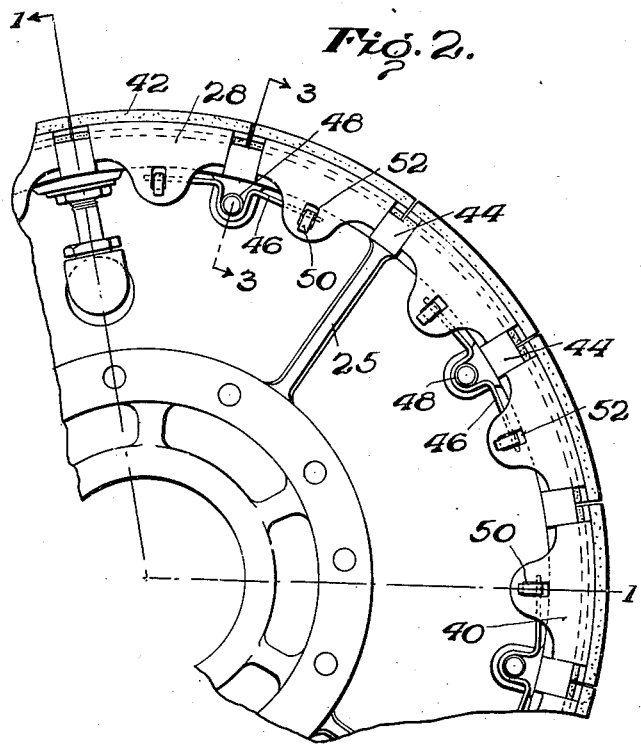
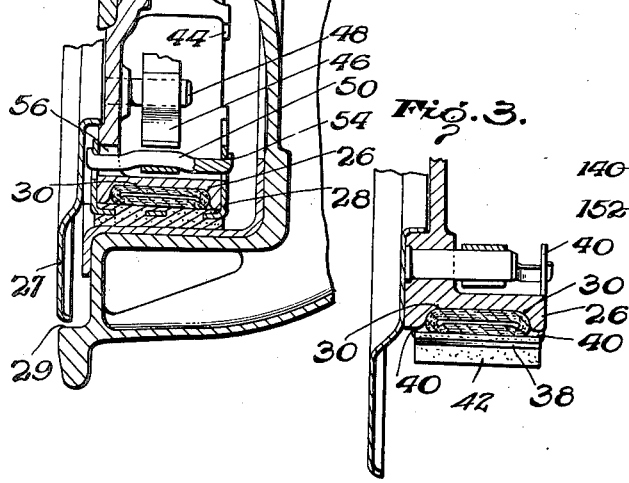
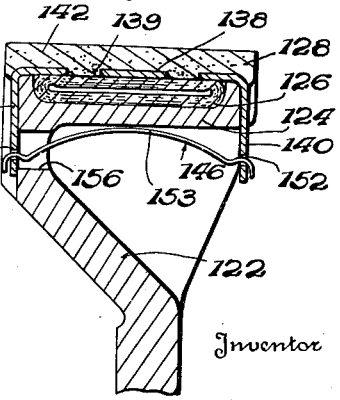
Inventor
Frederick C. Frank.
By
Attorney Jan. 2, 1940.  F. C. FRANK  2,185,250
BRAKE
Filed Feb. 23, 1937  2 Sheets-Sheet 2

INVENTOR
Frederick C. Frank.
BY
ATTORNEY

Patented Jan. 2, 1940

2,185,250

UNITED STATES PATENT OFFICE 2,185,250

BRAKE

Frederick C. Frank, South Bend, Ind., assignor to Bendix Products Corporation, South Bend, Ind., a corporation of Indiana Application February 23, 1937, Serial No. 127,233

9 Claims. (Cl. 188—152)

This invention relates to brakes and more particularly to hydraulic brakes of the type employing an annular fluid pressure expansible chamber for applying the friction brake shoes.

In hydraulic brakes of the above type the proximity of the expansible fluid chamber to the brake shoes which latter become heated to a high degree during brake application often causes serious difficulty, since heat transferred from the shoes to the chamber heats and expands the liquid and might in severe brake applications even cause the liquid to boil. This invention more particularly relates to brake shoe structure and its mounting upon the brake supporting structure, the shoes being especially designed to conduct heat away from and around the expansible chamber instead of radially therethrough. Other features of the invention, some of which flow from the design of the brake shoe, provide for improved construction throughout.

Accordingly an object of the invention is to provide a brake shoe constructed so as to insulate the same from an actuating expansible chamber adjacent to the shoe.

Another object of the invention is to provide a brake shoe with a metallic plate embedded therein and adapted through side flanges to conduct heat to a supporting structure.

A further object of the invention is to provide an arcuate brake shoe having side flanges adapted to position the brake shoe on a peripherally flanged support member, the side flanges being adapted to position the shoes in proper place and engage anchors on the support member.

A still further object of the invention is to provide a novel arrangement for resiliently holding the brake shoes on the support member and normally in release position.

Yet another object of the invention is to provide a brake structure constructed around a peripheral flange, channeled to receive an annular expansible chamber, and provided with a plurality of brake shoes, each having side flanges extending along substantially the length of the shoes and adapted to engage anchors on the sides of the flange.

The above and other novel features of the invention will appear more fully hereinafter from the following detailed description when taken in conjunction with the accompanying drawings. It is expressly understood however, that the drawings are employed for purposes of illustration only and are not designed as a definition of the limits of the invention, reference being had for this purpose to the appended claims.

In the drawings, wherein similar reference characters refer to similar parts throughout the several views:

Fig. 1 is a section through the brake support taken on planes passing through the brake axis and particularly along the line 1—1 of Fig. 2, all the brake shoes being removed except those adjacent to or cut by the section;

Fig. 2 is a side elevation of the brake with the brake drum removed;

Fig. 3 is a fragmentary section taken on a plane passing through the brake drum and taken on the line 3—3 of Fig. 2;

Fig. 4 is a section through a modified form of brake shoe and support;

Figure 6:
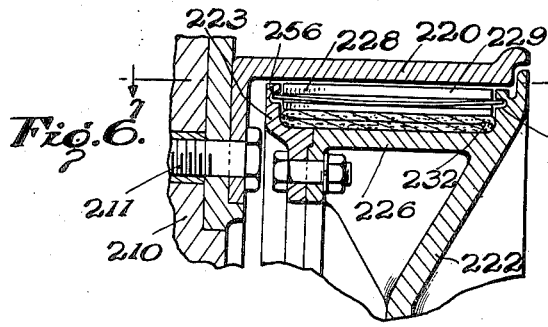
Fig. 6 is a fragmentary sectional view of a modified form of brake.

Referring to the drawings, in Fig. 1 there is shown a fragment of a wheel 10 mounted upon a bearing 12, and carrying a tire retaining bead flange 14. The radial end wall 16 of the wheel is recessed to provide an internal cylindrical seat 18 in which is seated a brake drum liner 20, the same being secured to the wheel by fastening means such as bolts.

The stationary or fixed portion of the brake comprises a plate 22 having an inner portion 24 adapted for fixation to an axle flange or other part, not shown, and a peripheral axially extending flange portion 26 adapted to carry a plurality of brake shoes 28. The peripheral flange is provided with an annular channel 30 in its outer cylindrical face. An annular flattened expansible fluid pressure chamber 32, the outer surface 34 of which lies substantially flush with the outer surface 36 of the flange 26 is nested in the annular groove 30.

Around the periphery of the flange 26 are arranged a plurality of brake shoes 28, each shoe having a channeled cross-section and comprising an arcuate plate 38 with side flanges 40, the arcuate plate being perforated and embedded in a lining material 42. The side flanges 40 are adapted to closely embrace the side faces of the support plate flange 26 so as to conduct heat from the brake shoe to the support flange, and the side flanges 40 are adapted also at either end to engage projecting anchor abutments 44 evenly spaced along either side wall of the flange 26, the flanges 40 being slightly shortened in order to provide space for the anchors. The brake shoes 28 are resiliently maintained against the outer face of the flange 26 by springs 46 bearing on studs 48 secured to the backing plate 22 and against cross-bars 50 extending crosswise from the flanges 40 on each side of the brake shoe. For this purpose the flanges 40 are notched as at 52 and the cross-bars 50 are notched as at 54 to assure against axial movement. It will also appear that the backing plate 22 is provided with a plurality of radially elongated apertures 56 through which the cross-bars 50 may extend.

The annular expansible tube 32 is provided, as shown in Fig. 1, with a fluid pressure connection 58 extending radially inward into an axially extending connection 60 passing through the backing plate 22, and in practice the pipe 60 is connected to a source of fluid pressure or master cylinder as would be the case in a hydraulic braking system.

In order to prevent rapid heat transfer from the brake shoe directly to the anular expansible chamber 32 which in severe braking practice would cause boiling of the liquid and undue expansion thereof, the brake lining 42 is preferably molded completely around and on both sides of the supporting plate 38 so that the supporting plate 38 may conduct the heat from the brake shoe around the annular expansible chamber to the supporting structure, the brake lining on the under side of the plate 38 insulating the expansible chamber from direct heat from the braking surface.

In Fig. 4 there is shown a modified section of a brake shoe wherein the lining does not extend on both sides of the supporting plate. In this figure the backing plate is shown as at 122, having a flange 124 grooved to receive an expansible chamber 126 and carrying a friction shoe 128 thereon. The friction shoe as in Figs. 1, 2 and 3 comprises a channeled arcuate plate 138 with side flanges 140 extending substantially the entire length of the arcuate portion. While the lining 142 does not extend on both sides of the plate 138 as in the case of Figs. 1, 2 and 3, heat generated in the lining 142 is transmitted to the plate 138 and thence to the elongated side flanges 140 from whence the heat is transferred to the side faces of the supporting structure 122 and its flange 124. As in shoe 28, the arcuate plate portion 138 may be provided with apertures 139 to assist in holding the lining on. In each of the modifications, the plate 38 or 138 extends the entire length of the lining to support the same and to carry the heat away.

An alternative construction for resiliently maintaining the shoe in released position appears in this modification, the same being constituted by a resilient leaf spring member 146 passing through an elongated opening 156 in the supporting structure and hooked at either end in slots 152 in the side flanges 140 of the brake shoe. The leaf spring has a set such that its middle portion 153 may bear against the inner surface of the supporting structure flange 124, thereby maintaining the shoe radially retracted.

The supporting structure or backing plate 22 (see Figures 1-3) is of light construction and is preferably provided with a plurality of strengthening webs 25 which may preferably be positioned to coincide with some of the anchor abutments 44 and in order to completely enclose the braking structure, a light fairing in the form of an annular disc 27 may be secured to the backing plate adjacent its outer periphery, which plate may nest in a corresponding recess 29 in the side face of the wheel structure.

In operation it will readily appear that fluid pressure is applied to the annular expansible chamber which in turn forces each of the brake shoes outwardly into engagement with the brake drum. The brake shoes anchor at either end against the anchor abutments depending upon the rotation direction of the drum and consequently there is a slight servo action resulting which tends to add to the applying fluid pressure. Upon release of the fluid pressure the shoes are radially retracted by the spring 46, thereby releasing the brake.

It will therefore appear that the present brake is one which may serve to handle heavy braking loads efficiently and with uniform wear. It will also appear that the shoes are readily exchangeable with a minimum of trouble and the entire structure is one of simplicity requiring substantially no adjustment.

Figure 5:
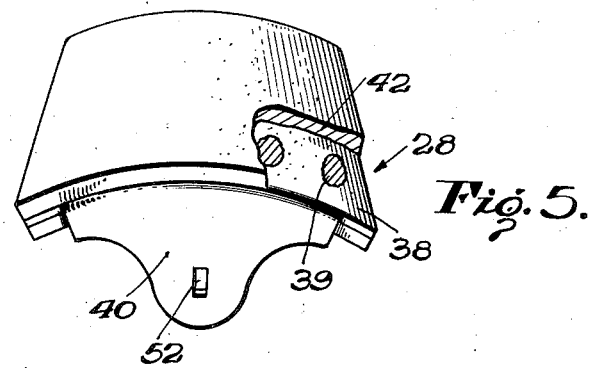
Fig. 5 is a view in perspective intended to show one of the brake shoes of Figures 1, 2 and 3 more clearly, having a portion of the lining broken away to show the metal insert to which the lining is molded.

In Fig. 5 the shoe 28 is shown with a portion of the lining material 42 broken away to show the arcuate plate 38 and the perforations 39 thereof in which the lining material 42 is embedded.

Figure 7:
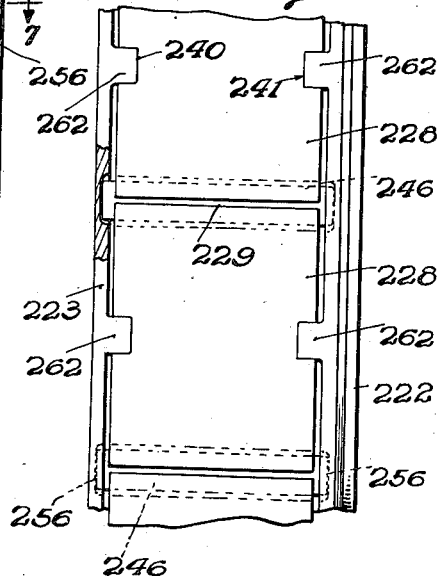
Fig. 7 is a sectional view taken substantially on the line 7—7 of Fig. 6.
Figure 8:
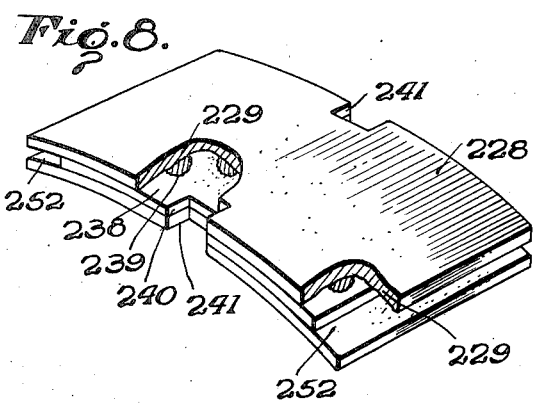
Fig. 8 is a perspective view of one of the shoes of Figs. 6 and 7 having portions of the lining broken away to show more clearly the construction thereof.
Figure 9:
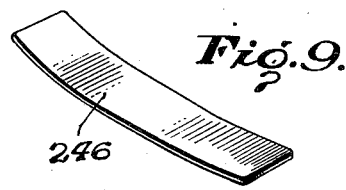
Fig. 9 is a view in perspective of one of the springs used in connection with the shoes of Figs. 6, 7 and 8.

In Figs. 6, 7 and 9 another embodiment of the invention is shown having a brake drum 220 secured to the wheel structure 210 as by bolts 211. The stationary or fixed portion of the brake comprises a member 222 adapted for fixing to an axial flange or other part not shown and a peripheral extending flange portion 226 adapted to carry a plurality of brake shoes 228 forms a fluid pressure chamber and has an outer surface 234 which contacts the brake shoes 228.

Each brake shoe 228 comprises an arcuate plate 238 formed with a pair of notches 240 which are aligned with notches 241 formed in the lining material 229. The plate 238 is perforated as at 239 and the lining material is embedded in the perforations. That is, the plate 238 forms an insert with lining material on both its sides and extending through its perforations 239. The shoes 228 are provided with grooves 252 formed by extending the ends of the lining material 229 beyond the ends of the plate 238. Thus the shoes 228 are resiliently maintained against the outer face 234 of the tube 232 by springs 246 which extend through the grooves 252 and into notches 256 formed in the member 222 and its associated plate 223.

A member 222 and its associated plate 223 are formed with lugs 262 which extend into the slots 240—241 for taking the anchoring load of the brake shoes on the members 222—223.

Although several embodiments of the invention have been illustrated and described, it is to be understood that the invention is not limited thereto but may be embodied in various other forms. As many changes in construction and arrangement of parts may be made without departing from the spirit of the invention, as will be apparent to those skilled in the art, reference will be had to the appended claims for a definition of the limits of the invention.

What is claimed is:

1. A brake shoe comprising an arcuate supporting member, channeled in cross-section, the channel flanges extending substantially the length of the member and towards the center of curvature of the shoe, and having in its arcuate portion one or more perforations, and friction lining molded on the outer and inner surface of said arcuate portion and through said perforations.

2. A brake shoe comprising an arcuate supporting member, channeled in cross-section, the channel flanges extending substantially the length of the member and towards the center of curvature of the shoe, and having in its arcuate portion one or more perforations, and a substantially uniform thickness of friction lining molded on the outer and inner surface of said arcuate portion and extending integrally through said perforations.

3. A brake shoe comprising an arcuate supporting member, channeled in cross-section, the channel flanges extending substantially the length of the member and towards the center of curvature of the shoe, and having in its arcuate portion one or more perforations, and a composition layer on the inner surface of said arcuate portion and extending integrally through said perforations and which is adapted to retard heat transference from the surface radially inward.

4. In a brake, an arcuate supporting member, having a channeled outer surface, and side walls, an annular radially expansible fluid chamber in said channel, a brake shoe on the supporting member and adapted to be moved radially outward by said chamber, said brake shoe comprising a metal reinforcing plate having side flanges and a lining, said side flanges engaging the side walls of the supporting member in heat-transfer surface engagement.

5. In a brake, an arcuate supporting member, having a channeled outer surface, and side walls, an annular radially expansible fluid chamber in said channel, a brake shoe on the supporting member and adapted to be moved radially outward by said chamber, said brake shoe comprising a metal reinforcing plate having side flanges and an inner and outer lining, said side flanges engaging the side walls of the supporting member whereby heat may be transferred directly from said plate to said support, by said flanges and direct heat transfer substantially prevented from said plate to said chamber.

6. In a brake, a brake shoe channeled in cross-section, a support in the channeled section, an anchor on the side of said support adapted to be engaged by one end of one of the sides of the channel, and fluid pressure means nested between the support and the shoe for thrusting the shoe away from the support, the sides of said shoe being in surface engagement with the sides of the support to transfer heat thereto.

7. A brake shoe comprising an arcuate supporting member having in its arcuate portion one or more perforations, and friction lining molded on the outer and inner surface of said arcuate portion and through said perforations.

8. In a brake, a supporting member, a plurality of brake shoes arranged around the periphery of said member each formed of an arcuate metallic supporting member having in its arcuate portion one or more perforations and friction lining molded to said arcuate portion and extending over the inner face thereof, fluid pressure means comprising a tube nested between the support and the shoe for thrusting the shoe away from the support, and resilient means associated with said shoes for urging said shoes radially inward, said metallic member being in close contact with said supporting member to transfer heat thereto from the friction lining and minimizing the transfer of heat to the fluid pressure means.

9. A brake shoe comprising an arcuate supporting member having in its arcuate portion one or more perforations and having on each side adjacent to the center thereof a slot on which the shoe is arranged to anchor, and friction lining molded on the outer and inner surface of said arcuate portion and through said perforations.

FREDERICK C. FRANK.